United States Patent [19]

Held

[11] Patent Number: 5,292,037
[45] Date of Patent: Mar. 8, 1994

[54] METERING DISPENSER FOR A BULK MATERIAL CONTAINER

[75] Inventor: Wolfgang Held, Hard, Austria

[73] Assignee: Form Orange Produktentwicklung, Austria

[21] Appl. No.: 961,784

[22] Filed: Oct. 15, 1992

Related U.S. Application Data

[63] Continuation-in-part of Ser. No. 920,362, Aug. 14, 1992, abandoned.

[30] Foreign Application Priority Data

Feb. 16, 1990 [DE] Fed. Rep. of Germany ....... 4004818
Feb. 15, 1991 [WO] PCT Int'l Appl. .................. PCT/EP91/00301

[51] Int. Cl.$^5$ .............................................. G01F 11/10
[52] U.S. Cl. .................................... 222/339; 222/363; 222/563
[58] Field of Search ............... 222/363, 368, 339, 444, 222/452, 563

[56] References Cited

U.S. PATENT DOCUMENTS

| | | |
|---|---|---|
| 1,991,742 | 2/1935 | Green . |
| 3,204,833 | 9/1965 | Weitzner . |
| 3,393,838 | 7/1968 | Syverson et al. . |
| 3,744,865 | 7/1973 | Syverson . |
| 3,750,902 | 8/1973 | Starrett ...................... 222/368 |
| 3,805,999 | 4/1974 | Syverson . |
| 4,053,087 | 10/1977 | Lack et al. ...................... 222/363 X |
| 4,266,695 | 5/1981 | Ruperez ........................ 222/363 X |
| 4,505,407 | 3/1985 | Johnson . |

FOREIGN PATENT DOCUMENTS

| | | |
|---|---|---|
| 56098 | 5/1962 | Australia . |
| 58325 | 7/1976 | Australia . |
| 0197342 | 10/1986 | European Pat. Off. . |
| 0296632 | 12/1988 | European Pat. Off. . |
| 2809924 | 10/1978 | Fed. Rep. of Germany . |
| 2415796 | 8/1979 | France . |
| 602215 | 2/1960 | Italy .................................. 222/363 |
| 74915 | 4/1949 | Norway . |
| 9112494 | 8/1991 | PCT Int'l Appl. ................. 222/363 |

*Primary Examiner*—Gregory L. Huson
*Attorney, Agent, or Firm*—Speckman, Pauley & Fejer

[57] ABSTRACT

A metering dispenser for a bulk material container, wherein the metering dispenser includes an adapter which is connected to the bulk material container. The adapter has an inlet opening which is in communication with a delivery conduit. A rotary slider having a metering chamber is rotatably mounted about a rotational axis which is disposed through the adapter and/or the delivery conduit. A tang is mounted on the rotary slider, eccentrically with respect to the rotational axis. The tang is used to engage the rotary slider between a first position wherein communication is open between the inlet opening and the metering chamber and wherein communication is closed between the metering chamber and the delivery conduit, and a second position wherein communication is closed between the inlet opening and the metering chamber and wherein communication is open between the metering chamber and the delivery conduit.

13 Claims, 3 Drawing Sheets

METERING DISPENSER FOR A BULK MATERIAL CONTAINER

This is a continuation-in-part patent application of my co-pending U.S. patent application having Ser. No. 07/920,362, filed on Aug. 14, 1992 and now abandoned.

BACKGROUND OF THE INVENTION

1. Field of the Invention

This invention relates to a metering dispenser for a bulk material container wherein a rotary slider is rotatably mounted and engaged between one position wherein a fluid, powder or the like is transferred from the bulk container to a metering chamber within the rotary slider, and another position wherein the same fluid, powder or the like is transferred from the metering chamber to a delivery conduit.

2. Description of Prior Art

Conventional dispensers can be found on automatic drink dispensers in which a container for a powder, such as coffee or cocoa, is positioned above a box-shaped metering container which is displaceable in a crosswise direction with respect to the axis of the container, as taught by U.S. Pat. Nos. 3,393,838, 3,744,865 and 3,805,999. The guide of such a metering container is relatively short and thus it often tends to jam. The walls, which are positioned crosswise with respect to the displacement movement, are subjected to a certain amount of stress because of the friction of the metering container walls against them. Furthermore, such conventional devices are not universally usable without great disadvantages. The problem of a lack of stability occurs particularly in the household, and more particularly when dispensing baby food, which requires that the container must be held with one hand while it is attempted to pull the metering container with the other hand. The user does not always have both hands free while working, so that often a portion of the powder is spilled. This would be the case particularly with baby food.

For uses with baby food, it is also known to empty a container into a measuring cup or other similar metering container, but essentially the same disadvantages are present.

It is also known to provide cell-like metering containers where, although the guide in its cylindrical housing generally prevents spilling, the requirement for two-handed operation occurs, at least in the household, since one hand must hold the container while the other hand turns an appropriate operational manipulator, such as a rotating knob, toggle or the like.

SUMMARY OF THE INVENTION

It is one object of this invention to provide a reliable and easily operable dispenser that accurately delivers or dispenses a specified amount of material.

Because elements of the apparatus of this invention are displaced with respect to each other in the direction of the container axis, it is possible to brace one end of the apparatus against an object, such as a table top or the container holding the fluid components. The apparatus of this invention can be grasped with one hand. In any case, the container is easily stabilized by the particular operating movement. It is also much easier to provide a reliable and effective sliding guide for the metering container, so that it can move easily from one position to another.

In one preferred embodiment according to this invention, it is not necessary to move and operate components having relatively large masses, even with a relatively large metering chamber, which further contributes to stability of the apparatus.

The apparatus of this invention is particularly suitable for one-handed manipulation or operation because in one preferred embodiment, a displacement distance of the sliding device is automatically returned under the effect of the load device by a spring, a rubber body, or the like. The sliding device can be locked in a filling position against the force of the load device, with the use of a stop which can be triggered with a handle or another operating device, for example in a manner similar to that used in conventional automatic umbrellas. However, particularly if larger fluid masses must be moved, there is a disadvantage that during operation the sliding device can impact under the force of the load device, at the end of its displacement, and bulk material can be lost in the process.

According to other particularly advantageous embodiments of this invention, it is possible to adapt the metering chamber to accommodate various bulk materials and/or operating different conditions, for example, varying dosing amounts as a function of the age of a baby.

Although the dispenser according to this invention can be used in many applications, such as in automatic drink dispensers, particular advantages are achieved with a rotary slider that operates between two defined positions.

BRIEF DESCRIPTION OF DRAWINGS

Further details of the invention ensue from the following description of preferred embodiments illustrated in the drawings, wherein.

DESCRIPTION OF PREFERRED EMBODIMENTS

Various preferred embodiments for accomplishing the above-identified and other objects of this invention are taught in Patent Cooperation Treaty Patent Publication WO 91/12494, dated Aug. 22, 1991, having International Application No. PCT/EP91/00301, filed with the International Bureau of the Patent Cooperation Treaty on Feb. 15, 1991. The teachings of such reference are incorporated into this specification by reference thereto.

Figure 1:
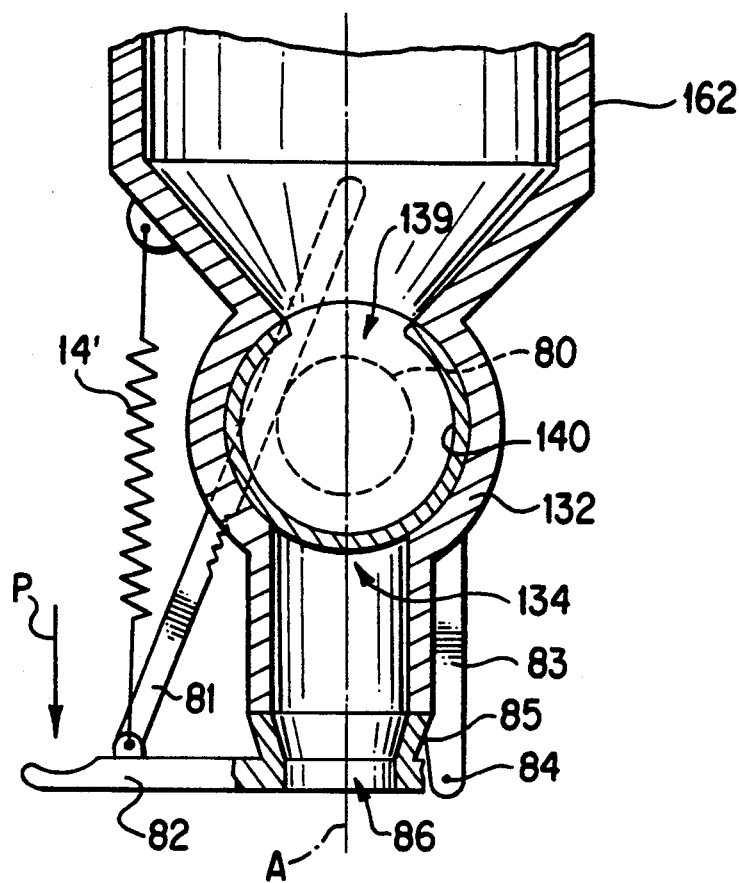
FIG. 1 is a cross-sectional view of a metering dispenser, according to one preferred embodiment of this invention.

Rotary slider 140, as shown in FIG. 1 of the drawings corresponding to this specification, is rotatable in slider housing 132 which is positioned below container 162. Toothed gear 80, or one toothed gear 80 on each of the two sides, is fixed on the same shaft as rotary slider 140.

Toothed rack 81, hinged on operating lever 82, is engaged with toothed gear 80. Operating lever 82 can be actuated in the direction of the arrow P, which is along a direction parallel to container axis A against the force of spring 144, where the length of toothed rack 81 and the diameter of toothed gear 80 are of such size, that when pressing down, rotary slider 140 is rotated about 180°, so that container opening 139 is closed during this rotation, but delivery opening 134 is opened.

Operating lever 82 can be embodied in different ways. In this case it is hinged on bearing rib 83 and pivotal around bearing neck 84; however, it can also be downwardly displaceable in a straight guide. Furthermore, it is supplied with funnel 85 which guides the bulk material into delivery opening 86. Alternatively, it would be possible to use its inclined position during operation in the direction of the arrow P to guide the bulk material over it towards the left.

In another preferred embodiment according to this invention, toothed rack 81, shown in FIG. 1, can be maintained in contact with toothed gear 80 either by only its own weight or with the assistance of a load spring.

FIG. 1 further discloses a preferred embodiment wherein the metering chamber is cylindrical and extends crosswise with respect to the container axis A. The metering chamber can be in communication with either container opening 139 or the oppositely positioned delivery opening 134. The cylindrical rotary slider 140 is seated, with an opening on its periphery, in the metering chamber. Rotary slider 140 can be pivoted between two operational positions, where it communicates with container opening 139 in the first operational position and where it communicates with delivery opening 134 in the second operational position. On its periphery, rotary slider 140 is constructed in a complementary fashion with the metering chamber.

The metering chamber has an axial opening which corresponds to the external diameter of rotary slider 140 and through which rotary slider 140 can be inserted within the metering chamber. Rotary slider 140 is preferably pivotal about a fixed shaft.

Rotary slider 140 has two oppositely oriented and cylindrical tangs, extending parallel to its rotational axis and laterally offset, which extend outward from the metering chamber. These tangs are guided within guide curves or guide channels of the operating device when the operating device performs linear displacement in the direction of container axis A.

The lengths of the guide curves or guide channels approximately correspond to the path which the corresponding tang travels when rotary slider 140 is rotated from one operational position into another. The curves are designed according to the course of motion of the tangs.

Figure 2:
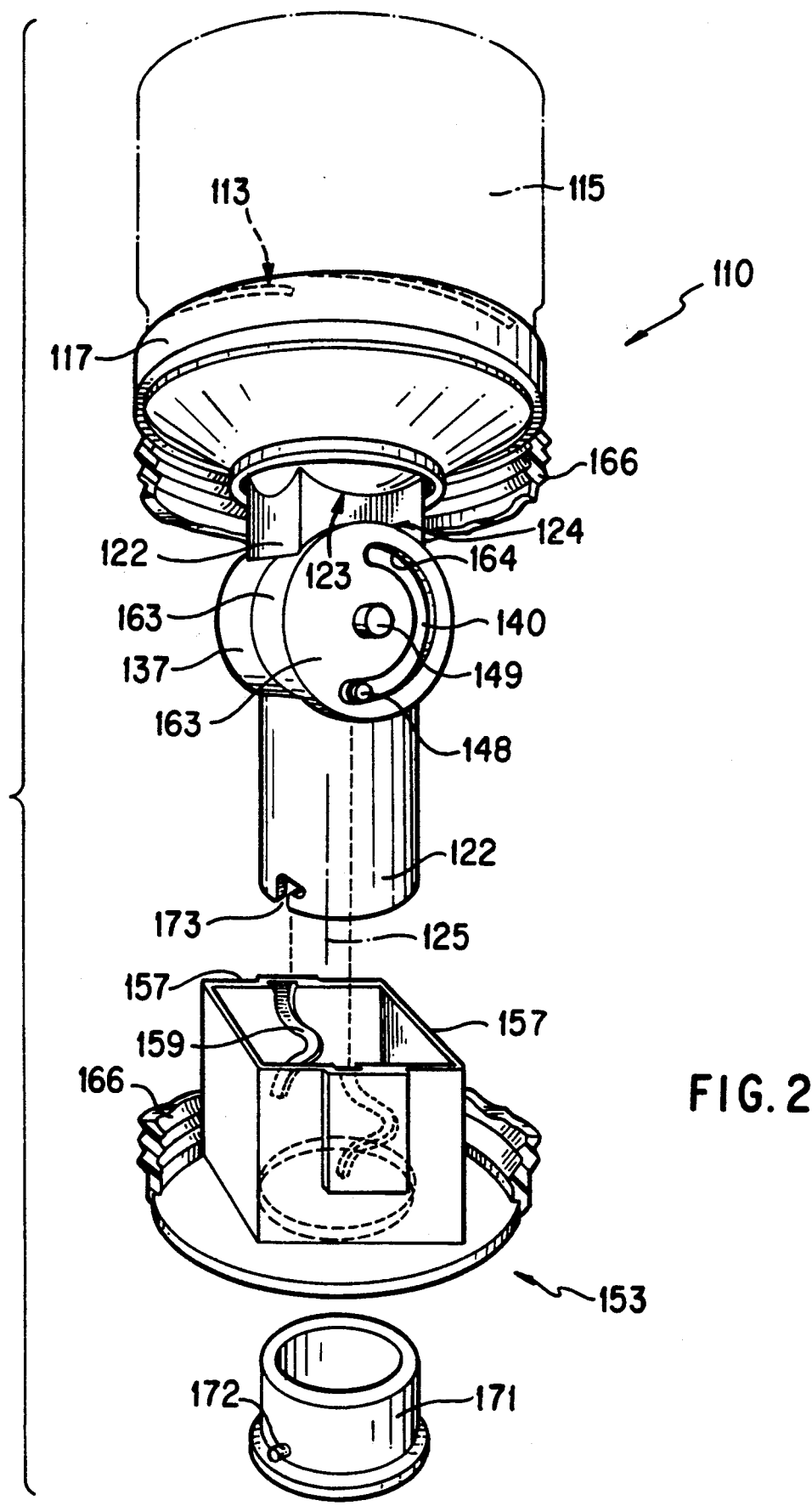
FIG. 2 is a perspective exploded view of a metering dispenser, according to another preferred embodiment of this invention.
Figure 3:
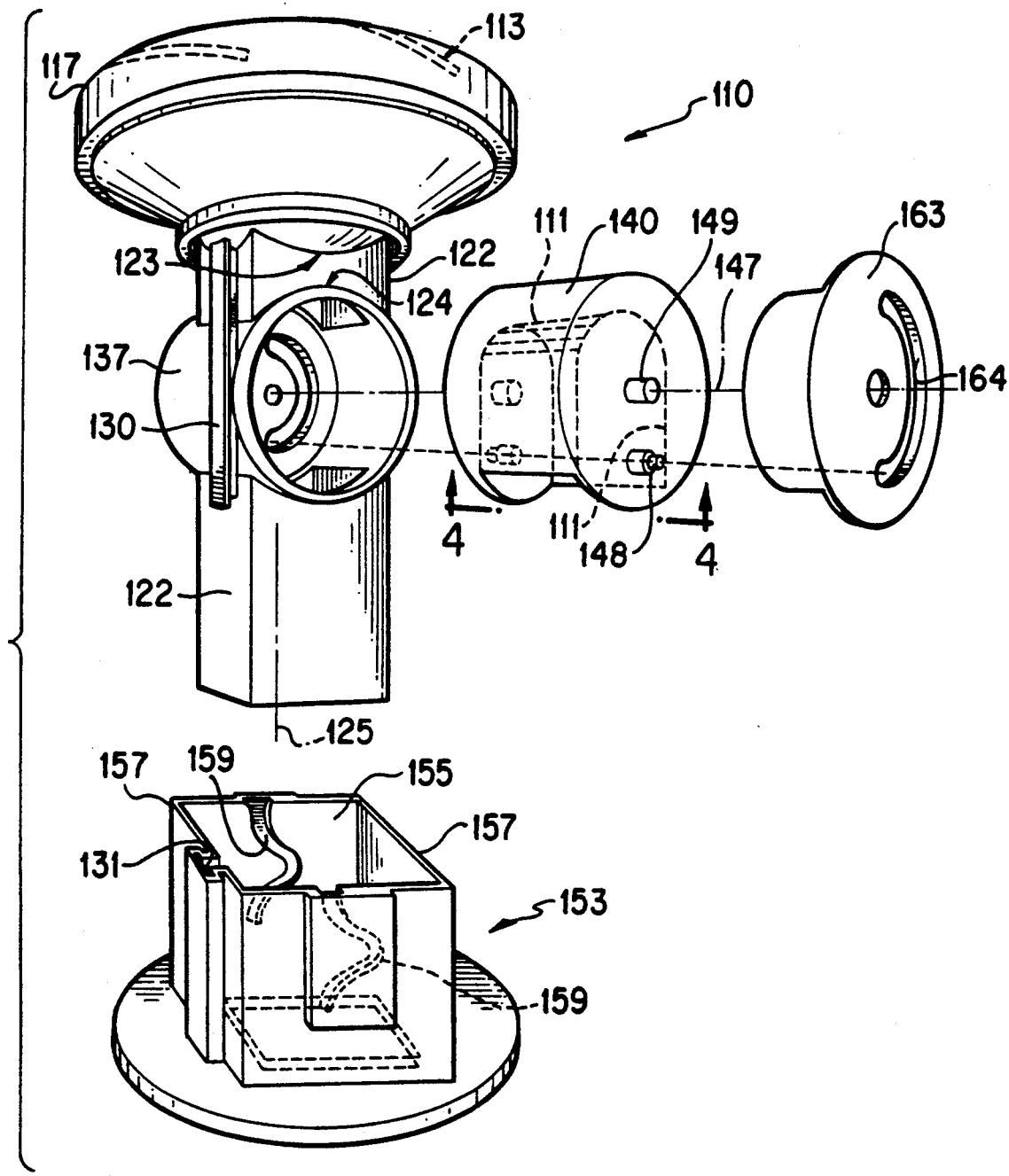
FIG. 3 is a perspective exploded view of the metering dispenser shown in FIG. 2, wherein the metering chamber is further exploded for clarity purposes.

FIGS. 2 and 3 show a perspective view of an assembled and a disassembled, respectively, metering dispenser according to other preferred embodiments of this invention. As generally shown by the phantom lines in FIG. 2, bulk material container 115 is connected to adapter 117 of metering dispenser 110. It is apparent that any suitable type of connection means can be used to connected adapter 117 to bulk material container 115. For example, as shown in FIG. 2, connection means 113 comprise adapter 117 having partial internal threads which engage with external threads on bulk material container 115. It is also apparent that other interference fits, O-rings, and the like can be used to connect adapter 117 to bulk material container 115.

Figure 5:
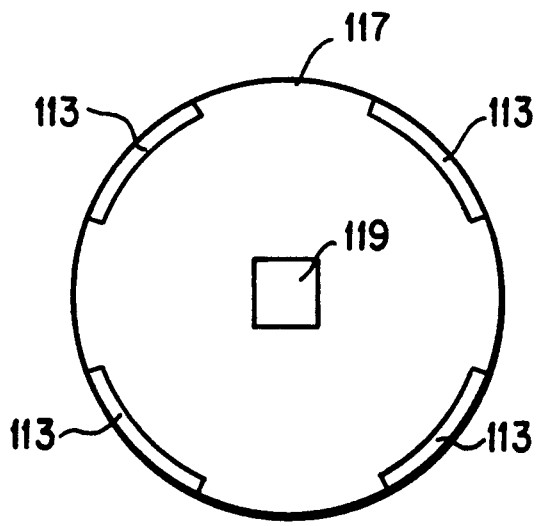
FIG. 5 is a top view of an adapter of the metering dispenser, according to one preferred embodiment of this invention.

As shown in FIG. 3, delivery conduit 122 has first end 123 which is sealably secured to adapter 117 and which is in communication with inlet opening 119 of adapter 117. FIG. 5 clearly shows inlet opening 119, in the top view of adapter 117. As shown in FIG. 3, opposite end 124 of delivery conduit 122 terminates at a housing for rotary slider 140.

Figure 4:
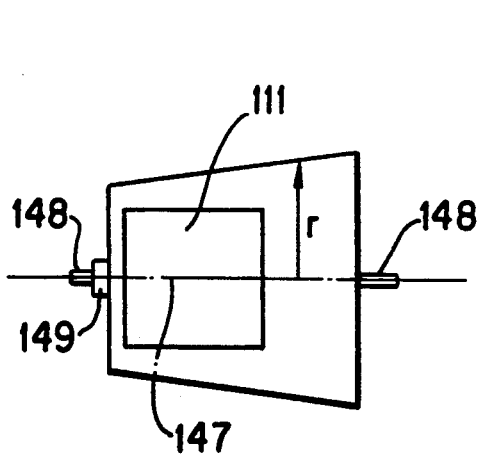
FIG. 4 is a bottom view taken in a direction along line 4—4, as shown in FIG. 3, of the rotary slider, according to one preferred embodiment of this invention.

Rotary slider 140 has an approximately cylindrical overall shape and has internal metering chamber 111, as shown in FIGS. 3 and 4. In one preferred embodiment according to this invention, rotary slider 140 has a tapered plug shape wherein radii r of rotary slider 140 decreases along rotational axis 147, as clearly shown in FIG. 4. The tapering shown in FIG. 4 is exagerated for clarity purposes. Such tapered shape not only provides a better seal about rotary slider 140 but also ensures proper assembly of rotary slider 140 within its housing.

Rotary slider 140 is rotatably mounted within the housing, such as the housing shown in FIGS. 2 and 3, about rotational axis 147. It is apparent that rotational axis 147 can be positioned within adapter 117 and/or delivery conduit 122. In one preferred embodiment of this invention, adapter 117 and delivery conduit 122 form an integral piece, such as an injection molded piece. It is apparent that any suitable arrangement and physical connection of rotary slider 140, delivery conduit 122 and/or adapter 117 can provide the desired results of this invention.

Rotary slider 140 preferably pivots or rotates between a first position wherein communication is open between inlet opening 119 and metering chamber 111 and communication is closed between metering chamber 111 and delivery conduit 122, and a second position wherein communication is closed between inlet opening 119 and metering chamber 111 and wherein communication is open between metering chamber 111 and delivery conduit 122.

In one preferred embodiment according to this invention, at least one tang 148 is mounted on rotary slider 140, preferably on a side wall of rotary slider 140, eccentrically with respect to rotational axis 147. As shown in FIG. 4, two tangs 148 are mounted on rotary slider 140, one on each side wall or end wall of rotary slider 140.

Engagement means are used to engage each tang 148 and thereby rotate rotary slider 140 between the first position and the second position. As rotary slider 140 rotates, the fluid, powder, or the like is maintained within metering chamber ill by corresponding side walls of housing 137, as shown in FIGS. 2 and 3. Also as shown in FIGS. 2 and 3, the engagement means comprise activation body 153 having receptacle 155 into which delivery conduit 122 is engageable. As shown in FIGS. 2 and 3, activation body 153 comprises side walls 157, two of which have curved guide channels 159. During operation, each tang 148 is engaged within a corresponding guide channel 159, such that when activation body 153 is relatively displaced with respect to tang 148, tang 148 follows guide channel 159. Thus, as shown in FIG. 2, when activation body 153 is displaced along longitudinal axis 125 toward adapter 117, tangs 148 follow guide channels 159 and thereby rotatably displace rotary slider 140. So that tang 148 can rotatably displace rotary slider 140, guide channel 159 is preferably non-linear. However, it is apparent that any suitably shaped guide channel 159 can be used to accomplish quick-opening, slow-opening, or other opening arrangements of metering chamber As shown in FIG. 3, the engagement means further comprise cover 163 which is attachable to activation body 153 and/or delivery conduit 122. When cover 163 is attached or clipped-on to the housing for rotary slider 140, cover 163 retains rotary slider 140 in its rotatably mounted position. Cover 163 preferably has arcuate slot 164. According to the preferred embodiment shown in FIGS. 2 and 3 arcuate slot 164 extends over an arc segment of approximately 180°.

As most clearly shown in FIGS. 3 and 4, peg 149 is mounted on rotary slider 140, along rotational axis 147. Peg 149 is insertable within either a through hole within cover 163 or another suitable bearing surface for accomplishing the pivotal or rotational movement of rotary slider 140.

According to another preferred embodiment of this invention, as shown in FIG. 3, the engagement means further comprise guide means for guiding activation body 153 in a direction parallel to longitudinal axis 125 of delivery conduit 122, as activation body 153 is moved or displaced with respect to adapter 117. As shown in FIG. 3, the guide means comprise guide rail 130 which is secured to delivery conduit 122 and/or activation body 153. Also as shown in FIG. 3, guide channel 131 is mounted on activation body 153. Guide channel 131 is correspondingly mateable with guide rail 130. It is apparent that guide rail 130 and guide channel 131 can be reversed in roles so that guide channel 131 is attached to delivery conduit 122 and guide rail 130 is attached to activation body 153. It is also apparent that guide rail 130 and guide channel 131 can have other suitable cross-sectional shapes and still accomplish the same result of guiding attachment body 153 in a direction parallel to longitudinal axis 125, during displacement.

It is apparent that other guide rails and/or guide channels can be used to guide the movement of activation body 153 with respect to tang 148, preferably along longitudinal axis 125. It is also apparent that two or more guide channels 131 or other guide means can improve the overall stability of operation of metering dispenser 110.

According to another preferred embodiment of this invention, the engagement means further comprise bias means 165 for urging activation body 153 into either the first position or the second position. Bias means 165 may comprise bellows 166, as only partially shown in FIG. 2, having one end abutting activation body 153 and an opposite end fixed with respect to adapter 117. It is apparent that other springs, such as those shown in FIG. 1, or spring-type elements can be used to accomplish the same result of urging metering dispenser 110 into either the first position or the second position.

According to yet another preferred embodiment of this invention, metering dispenser 110 further comprises stop means for limiting movement of activation body 153, during movement into the first position. For example, the stop means may comprise lock ring 171, as shown in FIG. 2, with tabs 172 that fit and lock into groove 173 of delivery conduit 122. It is apparent that other suitable lock means can be used to limit the outward movement of activation body 153 into the first position.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A metering dispenser for a bulk material container, the metering dispenser comprising:
    an adapter, connection means for connecting said adapter to the bulk material container, said adapter having an inlet opening;
    a delivery conduit having a first end sealably secured to said adapter and in communication with said inlet opening;
    a rotary slider having a metering chamber, said rotary slider rotatably mounted with respect to said deliver conduit about a rotational axis, said rotary slider having an approximately cylindrical overall shape, at least one tang mounted on said rotary slider eccentrically with respect to said rotational axis; and
    engagement means for engaging said tang and rotating said rotary slider between a first position of said rotary slider wherein communication is open between said inlet opening and said metering chamber and communication is closed between said metering chamber and said delivery conduit and a second position of said rotary slider wherein communication is closed between said inlet opening and said metering chamber and communication is open between said metering chamber and said delivery conduit, said engagement means comprising an activation body having a receptacle, said delivery conduit engageable within said receptacle, and said activation body comprising at least one side wall having a guide channel, said tang engageable within said guide channel, and said tang following said guide channel during relative displacement between said activation body and said tang along a longitudinal axis of said delivery conduit.

2. A metering dispenser according to claim 1 wherein said guide channel is non-linear.

3. A metering dispenser according to claim 1 further comprising a cover attachable to at least one of said activation body and said delivery conduit, said cover retaining said rotary slider in a rotatably mounted position with respect to said at least one of said adapter and said delivery channel.

4. A metering dispenser according to claim 3 wherein said cover has an arcuate slot and at least a portion of said tang extends through said arcuate slot.

5. A metering dispenser according to claim 4 wherein said arcuate slot extends over an arc segment of approximately 180°.

6. A metering dispenser according to claim 1 wherein said engagement means further comprise guide means for guiding said activation body along a longitudinal axis of said delivery conduit during displacement of said activation body with respect to said adapter.

7. A metering dispenser according to claim 6 wherein said guide means comprise a guide rail secured to one of said delivery conduit and said activation body, and one of said activation body and said delivery conduit having a guide channel correspondingly mateable with said guide rail.

8. A metering dispenser according to claim 1 further comprising a peg secured to said rotary slider along said rotational axis, and said peg pivotally mounted with respect to at least one of said adapter and said delivery conduit.

9. A metering dispenser according to claim 1 wherein said adapter and said delivery conduit are integrally formed together.

10. A metering dispenser according to claim 1 wherein said rotary slider has a tapered plug shape wherein radii of said rotary slider decrease along said rotational axis.

11. A metering dispenser according to claim 1 further comprising bias means for urging said activation body into one of said first position and said second position.

12. A metering dispenser according to claim 11 wherein said bias means comprise a bellows having one end abutting said activation body and an opposite end fixed with respect to said adapter.

13. A metering dispenser according to claim 11 further comprising stop means for limiting movement of said activation body during movement into said first position.

* * * * *